United States Patent
Miyajima et al.

(10) Patent No.: US 7,728,215 B2
(45) Date of Patent: Jun. 1, 2010

(54) PLAYBACK APPARATUS AND PLAYBACK METHOD

(75) Inventors: Yasushi Miyajima, Kanagawa (JP); Kosei Yamashita, Kanagawa (JP); Motoyuki Takai, Tokyo (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 976 days.

(21) Appl. No.: 11/211,461

(22) Filed: Aug. 26, 2005

(65) Prior Publication Data

US 2006/0054005 A1 Mar. 16, 2006

(30) Foreign Application Priority Data

Sep. 16, 2004 (JP) .............................. 2004-269085

(51) Int. Cl.
*G10H 1/38* (2006.01)
*G10H 7/00* (2006.01)

(52) U.S. Cl. ....................................................... 84/613
(58) Field of Classification Search .................. 84/609, 84/626, 613
See application file for complete search history.

(56) References Cited

U.S. PATENT DOCUMENTS

| 5,204,969 A * | 4/1993 | Capps et al. ................. 704/278 |
| 5,728,962 A * | 3/1998 | Goede .......................... 84/609 |
| 6,175,071 B1 * | 1/2001 | Ito .............................. 84/609 |
| 6,201,177 B1 * | 3/2001 | Ito .............................. 84/610 |
| 6,281,421 B1 * | 8/2001 | Kawaguchi ................... 84/603 |
| 6,791,021 B2 * | 9/2004 | Aoki ............................ 84/613 |
| 6,956,162 B2 * | 10/2005 | Koseki et al. ................. 84/609 |
| 2002/0007721 A1 * | 1/2002 | Aoki ............................ 84/613 |
| 2002/0023103 A1 * | 2/2002 | Gagne ....................... 707/501.1 |
| 2002/0026867 A1 * | 3/2002 | Hasegawa et al. ............. 84/609 |
| 2002/0143413 A1 * | 10/2002 | Fay et al. ....................... 700/94 |
| 2002/0144588 A1 * | 10/2002 | Naples et al. ................. 84/609 |
| 2003/0028516 A1 | 2/2003 | Nakata et al. |
| 2004/0055449 A1 * | 3/2004 | Akazawa et al. ............. 84/626 |
| 2004/0099126 A1 * | 5/2004 | Kawashima ................. 84/609 |

FOREIGN PATENT DOCUMENTS

| JP | 03-085819 | 4/1991 |
| JP | 06-133220 | 5/1994 |
| JP | 07-199926 | 8/1995 |
| JP | 08-146985 | 6/1996 |
| JP | 09-146554 | 6/1997 |
| JP | 2000-075868 | 3/2000 |
| JP | 2000-206972 | 7/2000 |
| JP | 2001-265333 A | 9/2001 |
| JP | 2002-006842 | 1/2002 |

* cited by examiner

*Primary Examiner*—Jeffrey Donels
(74) *Attorney, Agent, or Firm*—Oblon, Spivak, McClelland, Maier & Neustadt, L.L.P.

(57) ABSTRACT

A playback apparatus includes: a first acquiring unit acquiring sound content data; a second acquiring unit acquiring additional information corresponding to the sound content data acquired by the first acquiring unit; and a signal processor performing signal processing on the sound content data acquired by the first acquiring unit on the basis of the additional information acquired by the second acquiring unit and for outputting the processed sound content data.

17 Claims, 14 Drawing Sheets

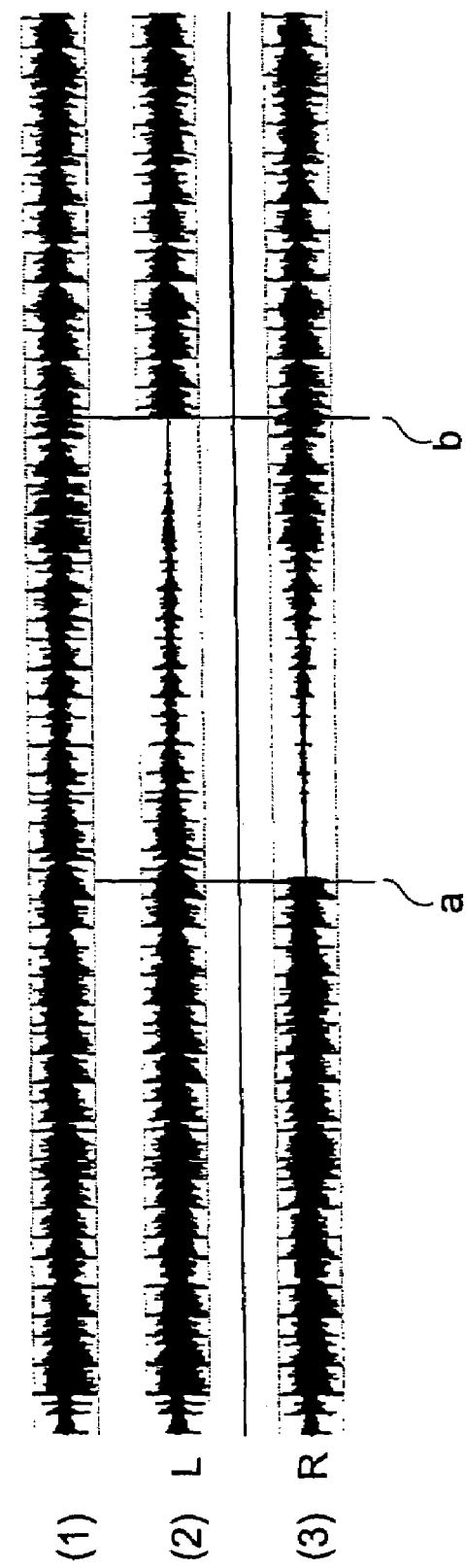

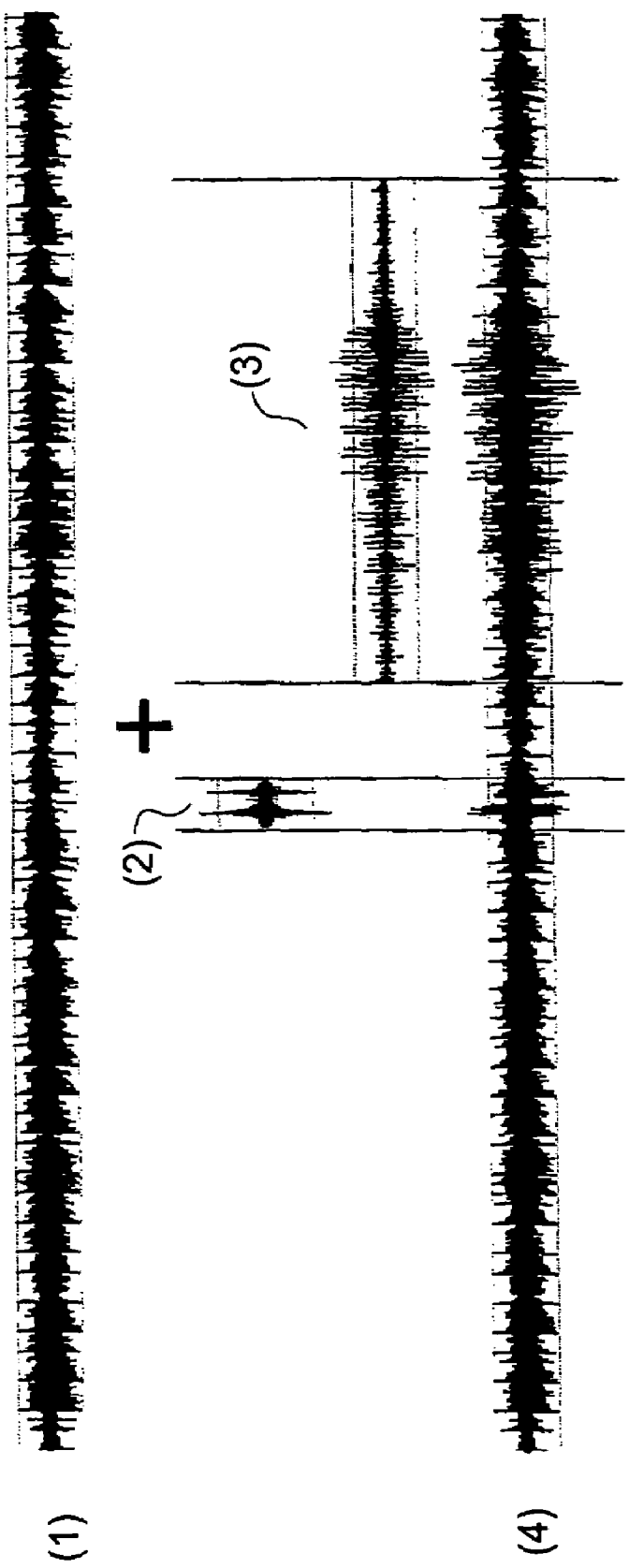

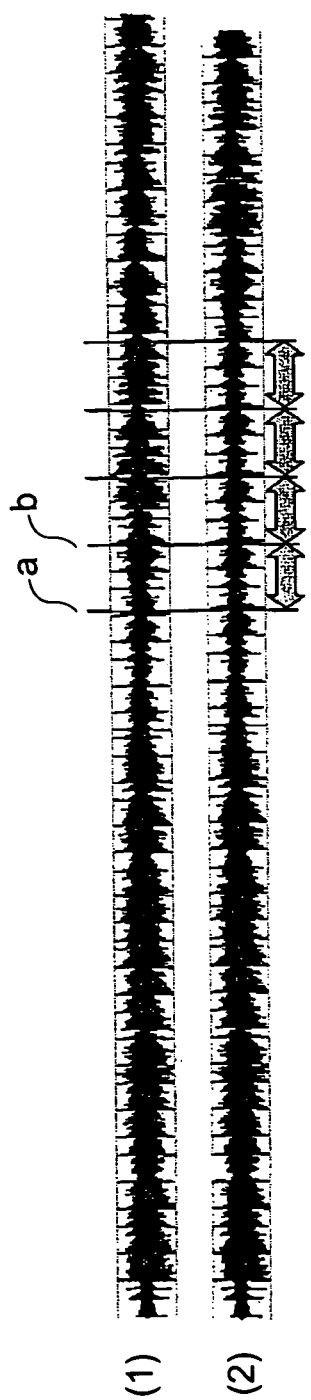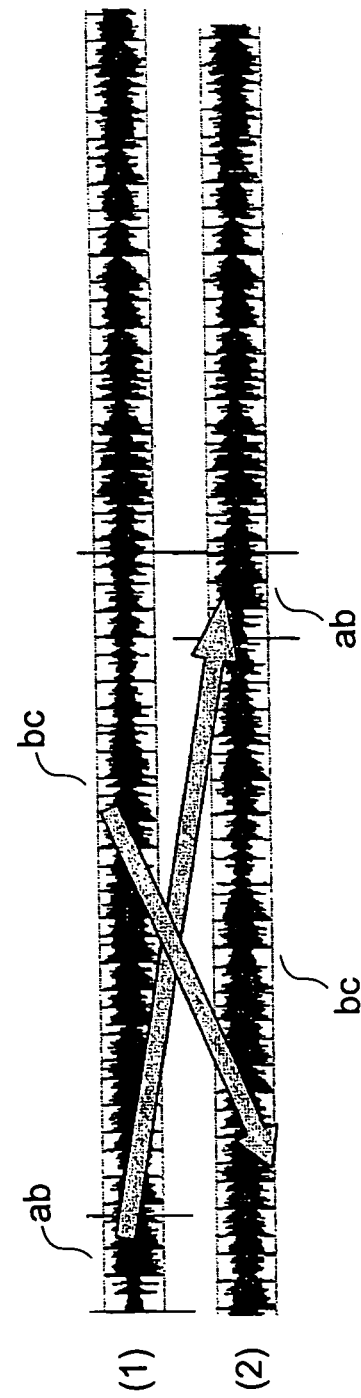
FIG. 7A
FIG. 7B

FIG. 8A

| START | END | CHORD |
|---|---|---|
| 0 0 : 0 0 : 0 0 0 | 0 0 : 0 4 : 1 2 0 | A♭ |
| 0 0 : 0 4 : 1 2 0 | 0 0 : 0 8 : 2 4 0 | E♭ |
| 0 0 : 0 8 : 2 4 0 | 0 0 : 1 7 : 4 0 8 | Fm |
| 0 0 : 1 7 : 4 0 8 | 0 0 : 2 2 : 5 1 5 | D♭ |
| ⋮ | ⋮ | ⋮ |

FIG. 8B

| START | END | DRUM PATTERN |
|---|---|---|
| 0 0 : 0 0 : 0 0 0 | 0 0 : 0 4 : 1 2 0 | Dr1 |
| 0 0 : 0 4 : 1 2 0 | 0 0 : 0 8 : 2 4 0 | Dr2 |
| 0 0 : 0 8 : 2 4 0 | 0 0 : 1 3 : 2 4 5 | Dr1 |
| 0 0 : 1 3 : 2 4 5 | 0 0 : 2 2 : 5 1 5 | Dr2 |
| ⋮ | ⋮ | ⋮ |

FIG. 8C

| START | END | TEMPO |
|---|---|---|
| 0 0 : 0 0 : 0 0 0 | 0 0 : 2 7 : 1 4 8 | 1 1 9. 4 5 |

FIG. 10A

| ARRANGE NUMBER | START TIME | END TIME | SOUND DATA NUMBER | CHORD | VOLUME |
|---|---|---|---|---|---|
| 1 | 00:00:000 | 00:04:120 | 1 | A♭ | −10dB |
| 2 | 00:04:120 | 00:08:240 | 2 | E♭ | −4dB |
| 3 | 00:08:240 | 00:13:245 | 3 | Fm | −10dB |
| 4 | 00:08:240 | 00:13:245 | 4 | Fm | −6dB |
| 5 | 00:13:245 | 00:22:515 | 1 | D♭ | 0dB |
| 6 | 00:13:245 | 00:22:515 | 3 | D♭ | −10dB |
| 7 | 00:22:515 | 00:27:148 | 3 | A♭ | −10dB |
| ⋮ | ⋮ | ⋮ | ⋮ | ⋮ | ⋮ |

FIG. 10B

| ARRANGE NUMBER | START TIME | END TIME | TEMPO (BPM) |
|---|---|---|---|
| 1 | 00:00:000 | 00:08:240 | 120.225 |
| 2 | 00:08:240 | 00:27:148 | 91.3 |
| ⋮ | ⋮ | ⋮ | ⋮ |

FIG. 10C

| ARRANGE NUMBER | START TIME | END TIME | REPEAT NUMBER |
|---|---|---|---|
| 1 | 00:00:000 | 00:04:120 | 2 |
| 2 | 00:13:245 | 00:22:515 | 2 |
| ⋮ | ⋮ | ⋮ | ⋮ |

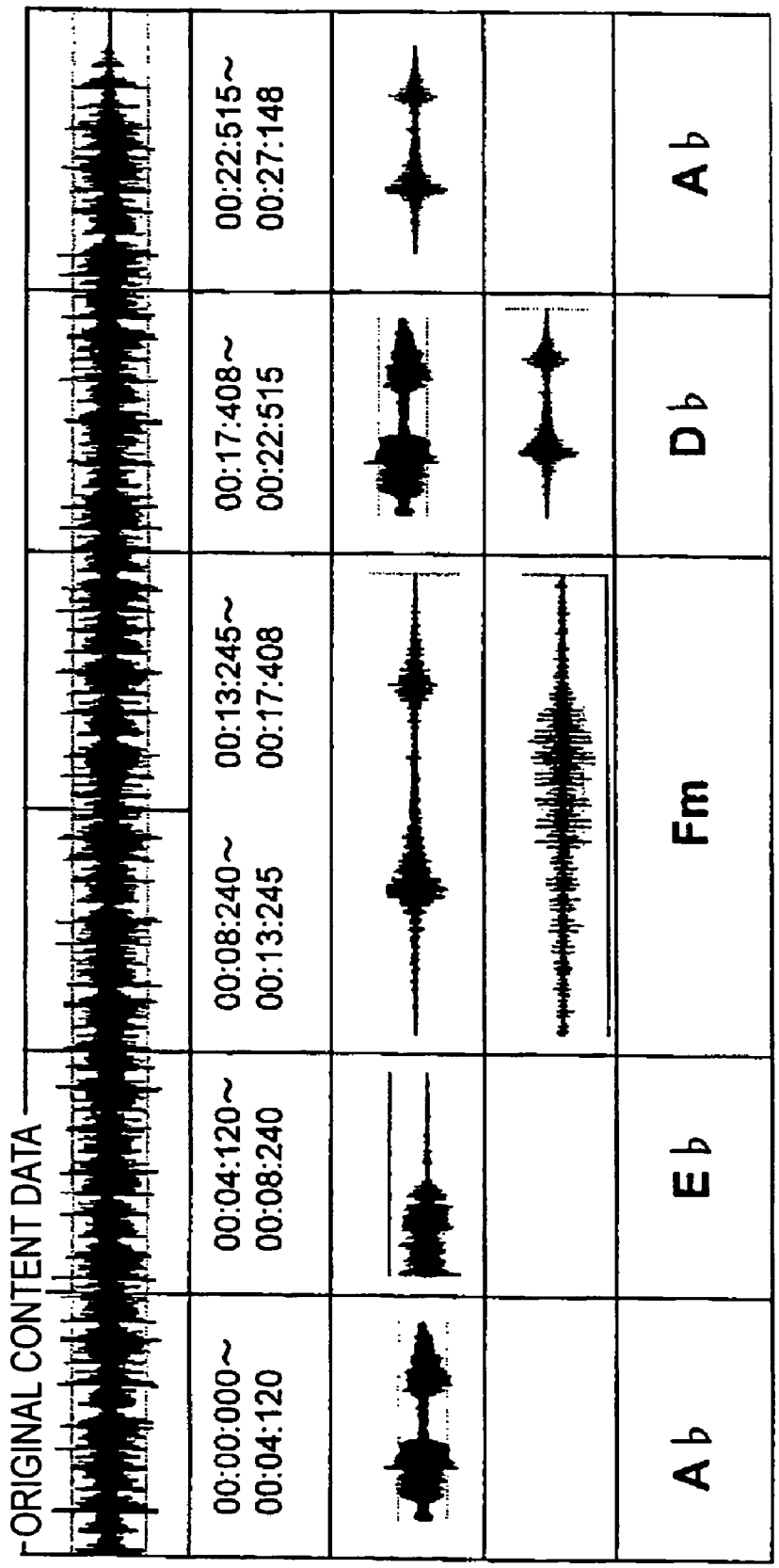

PLAYBACK APPARATUS AND PLAYBACK METHOD

CROSS REFERENCES TO RELATED APPLICATIONS

The present invention contains subject matter related to Japanese Patent Application JP 2004-269085 filed in the Japanese Patent Office on Sep. 16, 2004, the entire contents of which are incorporated herein by reference.

BACKGROUND OF THE INVENTION

1. Field of the Invention

The present invention relates to playback apparatuses and playback methods for sound content data provided via various recording media, such as compact discs (CDs), mini disc (MDs) (registered trademark)), digital versatile discs (DVDs), hard disks, and semiconductor memory cards, or networks, such as the Internet.

2. Description of the Related Art

Due to the recent widespread use of portable silicon audio players and hard disk music players, several hundreds to several tens of thousands of music pieces (music content) can be recorded and played back on and from a recording medium installed in a playback apparatus. This allows a user to carry a portable player to play back and listen to his/her favorite music pieces at any time from the recording medium.

Many music pieces can be recorded and played back on and from a recording medium, and the user can enjoy music for a long time. The user can also listen to music in an unexpected playback order by performing a so-called "shuffle playback operation" by playing back music by randomly changing the playback order, which does not bore the user. In known audio players, however, prerecorded music pieces are merely played back, and although the number of music pieces increases, the same sound of the individual music pieces is played back.

The latest trend in the music business shows that many remix albums produced by arranging existing music pieces have been released. It is not unusual that disk jockeys (DJs) produce new music pieces by using existing music pieces. Additionally, software and hardware for synthesizing sound by adjusting the pitch or tempo of sampled sound as desired are available for music professionals, semiprofessionals, and general users (music lovers).

For example, Japanese Unexamined Patent Application Publication No. 2003-044046 discloses an information processing apparatus and method for interactively editing or playing back music pieces by combining a plurality of sound materials in accordance with the input from a user by using a keyboard or a mouse. By using the technique disclosed in this publication, sound materials can be relatively easily processed.

SUMMARY OF THE INVENTION

However, the technique disclosed in the above-described publication, or software or hardware for editing music is for people who are skilled in arranging existing music, and general users can only enjoy the arranged music. Although some professionals, such as DJs, can arrange music in real time, such arrangements are largely made according to the capacity, favorites, or taste of DJs, and general users cannot add their tastes to their favorite music pieces.

Accordingly, there is a need for individual users to arrange music pieces as desired as easy as possible by adjusting the playback tempo, pitch, or volume, combining or inserting new sound, or repeating users' favorite portions or erasing unnecessary portions of music pieces.

In view of the above background, it is desirable to provide a playback apparatus and a playback method that can play back sound content data in various modes by easily and speedily making unique arrangements to many sound content data.

According to an embodiment of the present invention, there is provided a playback apparatus including: first acquiring means for acquiring sound content data; second acquiring means for acquiring additional information corresponding to the sound content data acquired by the first acquiring means; and signal processing means for performing signal processing on the sound content data acquired by the first acquiring means on the basis of the additional information acquired by the second acquiring means and for outputting the processed sound content data.

According to the aforementioned playback apparatus, signal processing is performed by the signal processing means on the sound content data acquired by the first acquiring means on the basis of the additional information acquired by the second acquiring means, thereby arranging the sound content data.

With this configuration, the sound content data can be changed after being subjected to the signal processing. Accordingly, content can be provided in a mode different from the original content data to users.

The signal processing means may perform at least one of adjusting the playback tempo of the sound content data, adjusting the playback pitch of the sound content data, adjusting the playback volume of the sound content data, combining at least one sound data with the sound content data, inserting at least one sound data into the sound content data, rearranging the order of part of the sound content data, repeating part of the sound content data, deleting part of the sound content data, and applying effect to the sound content data.

With this arrangement, content played back from existing sound content data can be arranged in various modes in accordance with additional information corresponding to the sound content data, and the content of the arranged content data can be played back and provided to the users. Accordingly, existing sound content data can be played back in various new modes and provided to the users.

The additional information may be associated with time information for specifying a portion of the sound content data to be processed, and the signal processing means may perform signal processing on the portion of the sound content data on the basis of the additional information associated with the time information.

With this arrangement, the additional information can specify which portion of the sound content data is associated with the additional information on the basis of the time information. This enables the signal processing means to easily perform signal processing on the portion of the sound content data.

The additional information may include at least one of the tempo, chord progression, pitch, duration, beat, structure information, type of musical instrument, and volume of the sound content data, and the signal processing means may identify the original state of the sound content data before being subjected to the signal processing on the basis of the additional information.

With this arrangement, the type of signal processing to be performed on the sound content data can be correctly specified, thereby enabling the signal processing means to perform suitable signal processing.

The structure information may include time information indicating at least one of the repeat pattern, introduction part, highlight part, first melody part, second melody part, and refrain part (impressive phrase including one to four bars repeated a several number of times in a music piece) of the sound content data, and the signal processing means may identify the original data structure of the sound content data before being subjected to the signal processing on the basis of the structure information.

With this arrangement, the additional information includes structure information concerning the sound content data, and the structure of the sound content data, such as the repeat pattern, introduction part, or highlight part, can be identified from this structure information.

Accordingly, arrangements, such as increasing or decreasing the repeats, deleting the introduction part, or repeating the highlight part, can be easily made for changing the content structure in the signal processing means.

The additional information may include at least one sound data to be combined with or inserted into the sound content data, and the signal processing means may combine or insert the sound data contained in the additional information with or into the sound content data.

This makes it possible to provide sound content data generated by combining or inserting new sound with or into the original sound content data to the users.

The signal processing means may combine or insert the sound data contained in the additional information with or into the sound content data by performing at least one of adjusting the tempo, adjusting the pitch, adjusting the volume, and applying effect on the sound data contained in the additional information.

With this arrangement, the sound data contained in the additional information can be suitably combined or inserted with or into the sound content data. Accordingly, the content played back from the resulting sound content data can be provided to the users without producing a sense of artificiality.

According to an embodiment of the present invention, the following advantages can be offered.

The user can enjoy sound content data, such as existing music pieces, and also, the user can make various arrangements to the existing music pieces on the basis of sound content provided by the sound content data.

It is possible to make arrangements to the same sound content data according to the individuals' tastes, and the user can arrange a music piece in various manners to, for example, sound with a beat or quite sound, depending on his/her mood according to various situations.

Additionally, only additional information including arrange-processing information without sound content data to be played back is provided. This enables only users having the sound content data to perform signal processing on the sound content data by using the additional data and to listen to the arranged sound content data within a limitation of personal use.

By generating and distributing, separately from the sound content data, additional information for making arrangements to sound content data, new modes can be provided for sound content, thereby promoting the activation of the entire music industry.

BRIEF DESCRIPTION OF THE DRAWINGS

FIGS. 2A through 7B illustrate various modes of arrange processing performed on sound content data;

FIGS. 8A, 8B, and 8C illustrate examples of tables, provided as additional data, indicating music information and the associated time information;

FIGS. 10A, 10B, and 10C illustrate specific examples of tables indicating arrange-processing information;

FIG. 11 illustrates an example of an arrange-processing time series map;

DESCRIPTION OF THE PREFERRED EMBODIMENTS

The present invention is described in detail below with reference to the accompanying drawings through illustration of a preferred embodiment.

Figure 1:
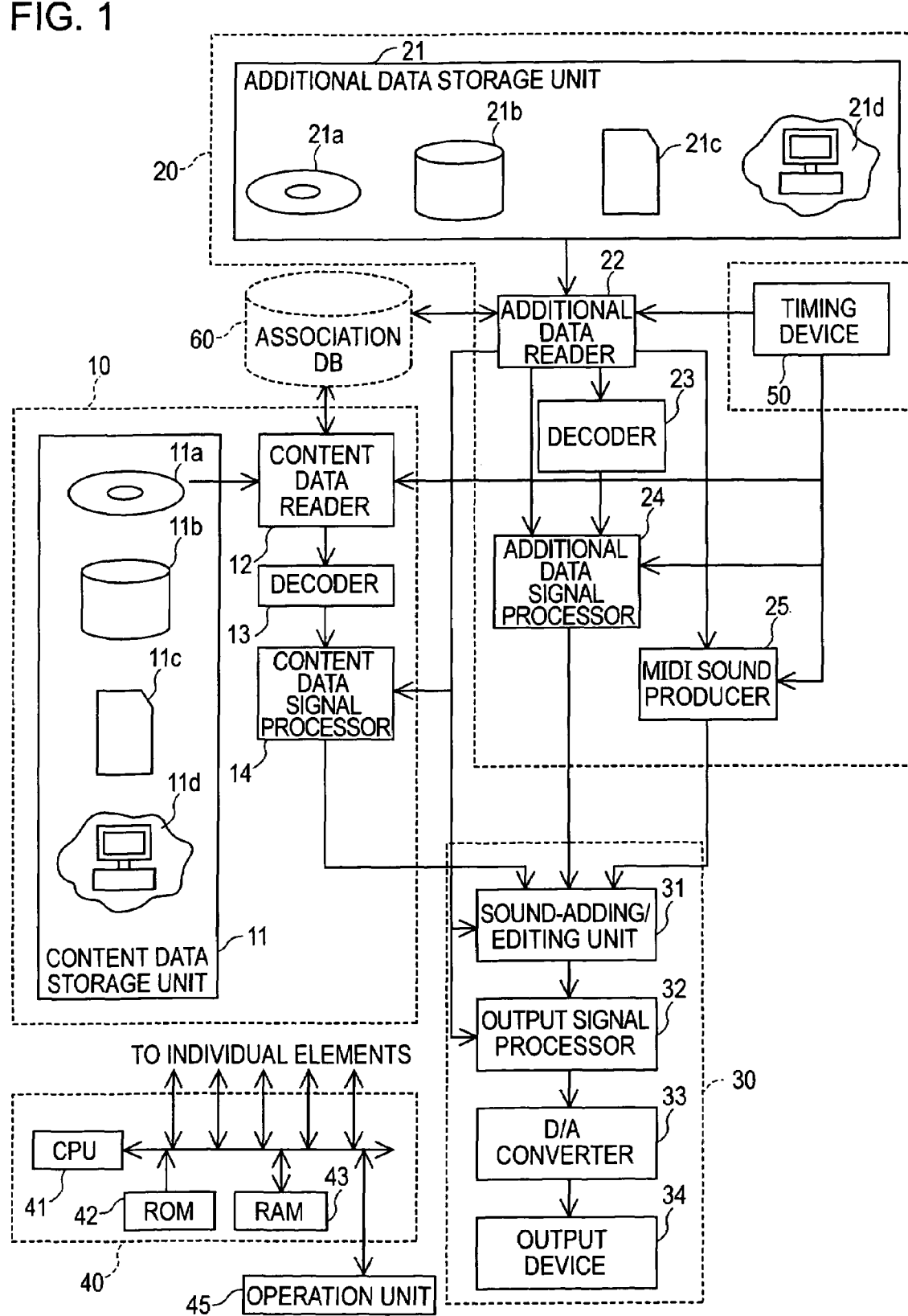
FIG. 1 is a block diagram illustrating a playback apparatus according to an embodiment of the present invention.

In a playback apparatus shown in FIG. 1, a playback operation can be performed by making various arrangements to sound content data (original data) of many music pieces provided via recording media, such as CDs or MDs, or networks, such as the Internet, by using additional information prepared separately from the original sound content data.

The playback apparatus shown in FIG. 1 includes a sound content data processing system 10, an additional data (additional information) processing system 20, an output data processing system 30, a controller 40, a timing device 50, and a sound-content-data/additional-data association database (hereinafter simply referred to as the "association DB") 60.

The sound content data processing system 10 includes, as shown in FIG. 1, a content data storage unit 11, a content data reader 12, a decoder 13, and a content data signal processor 14. The sound content data processing system 10 reads (obtains) sound content data to be played back from the content data storage unit 11 and performs processing for making various arrangements to the read sound content data.

The additional data processing system 20 includes, as shown in FIG. 1, an additional data storage unit 21, an additional data reader 22, a decoder 23, an additional data signal processor 24, and a musical instrument digital interface (MIDI) sound producer 25. The additional data processing system 20 reads (obtains) additional data associated with the sound content data to be processed in the sound content data processing system 10 and informs the sound content data processing system 10 of the type of signal processing on the basis of the obtained additional data. The additional data processing system 20 also performs processing on sound data contained in the additional data so that the processed sound data can be combined with (added to) or inserted into the sound content data to be played back.

The output data processing system 30 includes, as shown in FIG. 1, a sound-adding/editing unit 31, an output signal processor 32, a digital-to-analog converter (D/A converter) 33, and an output device 34, such as a speaker. The output data processing system 30 adds (combines) or inserts the sound data supplied from the additional data processing system 20 to the processed sound content data supplied from the sound content data processing system 10, or deletes part of the processed sound content data supplied from the sound content data processing system 10 or rearranges the order of the processed sound content data. The output data processing system 30 also performs various effect processing on the sound content data to be output.

The controller 40 is a microcomputer including, as shown in FIG. 1, a central processing unit (CPU) 41, a read only memory (ROM) 42, and a random access memory (RAM) 43 to control the individual elements of the playback apparatus of this embodiment. An operation unit 45 for receiving the input from a user is connected to the controller 40. Accordingly, the controller 40 can control the individual elements in accordance with the input from a user by using the operation unit 45.

The timing device 50 has a so-called "timing control function" for providing timing for the processing in the content data reader 12, the additional data reader 22, the additional data signal processor 24, and the MIDI sound producer 25. The association DB 60 manages the association between sound content data to be played back and the corresponding additional data.

In the sound content data processing system 10, the content data reader 12 reads the sound content data of a recorded music piece in accordance with the input from a user by using the operation unit 45. In this case, the music providing sources include, as shown in FIG. 1, a disc medium 11a, such as a CD, a DVD, or an MD, a magnetic disk 11b, a semiconductor memory 11c, or a network 11d, such as a server or a peer-to-peer connected personal computer, a wide area network (WAN), or a local area network (LAN) Accordingly, if the providing source of the sound content data is the optical disc 11a, such as a CD or a DVD, or a magneto-optical disk, such as an MD, the content data reader 12 is provided with an optical pickup. If the providing source of the sound content data is the magnetic disk 11b, the content data reader 12 is provided with a magnetic head. If the providing source of the sound content data is the semiconductor memory 11c, the content data reader 12 is provided with access means accessing the memory. If the providing source of the sound content data is the network 11d, the content data reader 12 is provided with a communication unit having a network connecting function.

If the sound content data read by the content data reader 12 is compressed by a data compression technique, such as the adaptive transform acoustic coding (ATRAC) method or the MPEG-1 audio layer-3 (MP3) method, the decoder 13 decodes the sound content data according to the corresponding compression method to convert the sound content data into linear pulse code modulation (PCM) data, and supplies the converted data to the content data signal processor 14.

The additional data reader 22 of the additional data processing system 20 reads the additional data corresponding to the sound content data read by the content data reader 12 of the content data processing system 10 under the control of the controller 40. In this embodiment, the same identifier is added to the sound content data to be played back and the associated additional data so that the sound content data and the corresponding additional data can be reliably associated with each other.

As in the sound content processing system 10, the medium storing the additional data is a disc medium 21a, for example, an optical disc, such as a CD or a DVD, or a magneto-optical disk, such as an MD, a magnetic disk 21b, a semiconductor memory 21c, or a network 21d, such as a WAN or a LAN. That is, any type of medium can be used as long as it can record or read sound content data.

The additional data reader 22 in this embodiment is provided with, for example, a CPU and a memory, to form data tables and data maps from various data for performing arrange processing, which are contained in the additional data, and supplies the generated data tables and data maps to the required elements, which is described in detail below. The arrange-processing sound data contained in the additional data is supplied from the additional data reader 22 to the additional data signal processor 24.

If the arrange-processing sound data contained in the additional data is compressed, it is decoded in the decoder 23 according to the corresponding compression method and is converted into linear PCM data. The converted data is then supplied to the additional data signal processor 24. If MIDI data is contained in the additional data, it is supplied from the additional data reader 22 to the MIDI sound producer 25 and is converted into linear PCM data.

The timing device 50 manages the playback time and the playback position of the sound content data to be played back, and controls, based on the playback time and playback position, the data reading timing and position of the content data reader 12 and the additional data reader 22 to read required portions of the sound content data and the additional data.

Upon receiving the arrange-processing sound data from the additional data reader 22 of the additional data processing system 20, the content data signal processor 14 of the sound content data processing system 10 performs signal processing on the sound content data on the basis of the received arrange-processing data to change (arrange) the content (playback sound) obtained from the sound content data. More specifically, the content data signal processor 14 adjusts the tempo, pitch, or volume, or applies effects, which is discussed in detail below.

The additional data signal processor 24 of the additional data processing system 20 changes the arrange-processing sound data contained in the additional data by performing predetermined signal processing on the arrange-processing sound data on the basis of the information contained in the additional data. More specifically, the additional data signal processor 24 adjusts the tempo, pitch, or volume, or applies effects, which is discussed in detail below. In this manner, by performing signal processing on the arrange-processing sound data, the arrange-processing sound data can be combined with or inserted into the original sound content data. If arrange-processing sound data is not contained in the additional data, the additional data signal processor 24 does not perform any processing.

If MIDI sound producing data (MIDI data) is contained in the additional data as arrange-processing sound data, it is supplied to the MIDI sound producer 25. The MIDI sound producer 25 is provided with a MIDI sound source, which is driven based on the MIDI data supplied from the additional data reader 22 and the timing supplied from the timing device 50 to output the sound producing result as linear PCM data. The linear PCM data is then supplied to the sound-adding/editing unit 31.

The arrange-processing sound data is not necessarily one item of data, and a plurality of sound data may be combined at the same time point. Alternatively, sound data may be switched at individual time points on the time axis and are then synthesized.

As described above, in the sound content data processing system 10, sound content data to be played back is obtained, and signal processing is performed on the obtained sound content data on the basis of arrange-processing data contained in the additional data read by the additional data reader 22 of the additional data processing system 20.

In the additional data processing system 20, additional data corresponding to the sound content data to be played back is obtained, and arrange-processing information contained in the obtained additional data for arranging the sound content data is supplied to the content data signal processor 14 of the sound content data processing system 10. The additional data signal processor 24 then processes the arrange-processing sound data contained in the additional data and supplies the processed arrange-processing sound data to the sound-adding/editing unit 31 of the output data processing system 30 and also supplies information concerning sound-content-data editing processing to the sound-adding/editing unit 31.

The sound-adding/editing unit 31 adds (combines) the arrange-processing sound data supplied from the additional data signal processor 24 or the MIDI sound producer 25 to the sound content data supplied from the content data signal processor 14. The sound-adding/editing unit 31 also performs editing processing, such as rearranging the order of a plurality of zones of the sound content data, or changing repeated portions or deleting predetermined zones of the sound content data supplied from the content data signal processor 14.

The processed sound content data output from the sound adding/editing unit 31 is supplied to the output signal processor 32. If there is no arrange-processing sound data or if the editing processing on the sound content data is not instructed by the additional data, the sound-adding/editing unit 31 directly supplies the sound content data from the content data signal processor 14 to the output signal processor 32 without performing adding or editing processing. In the sound-adding/editing unit 31, only one of the addition processing and the editing processing may be performed.

The output signal processor 32 performs final processing, such as effect processing and volume adjustment, on the sound content data supplied from the sound-adding/editing unit 31 on the basis of the additional data or under the control of the controller 40. The output signal processor 32 can perform various types of effect processing, such as reverb or echo processing.

The sound content data from the output signal processor 32 is then supplied to the D/A converter 33. The sound content data is converted into an analog sound signal and is then supplied to the output device 34, such as a speaker. With this configuration, the sound content data read by the sound content data processing system 10 is arranged according to the additional data read by the additional data processing system 20, and the arranged sound content data is played back to output the corresponding sound from the output device 34. Then, the user can listen to the sound corresponding to the content data.

As is seen from the foregoing description, in this embodiment, the content data reader 12 has a function, which serves as a first acquiring unit for acquiring sound content data to be played back, and the additional data reader 22 has a function, which serves as a second acquiring unit for acquiring additional data associated with the sound content data to be played back.

The content data signal processor 14, the additional data signal processor 24, the MIDI sound producer 25, the sound-adding/editing unit 31, and the output signal processor 32 implement a function, which serves as a signal processor for arranging sound content data to be played back.

The association DB 60 is a database for managing the association between sound content data and additional data, and allowing the user to specify from sound content data corresponding additional data or to specify sound content data from the corresponding additional data. Although the association DB 60 is not essential, it saves the user from manually searching for sound content data or allows the usable additional data to be listed from the sound content data. Accordingly, the provision of the association DB 60 increases the usability.

Various data structures can be considered for the association DB 60. The association DB 60 may simply manage the association between sound content data and additional data, or data may be classified according to the category or artist of sound content data or according to the type of arrange processing of the additional data.

The association DB 60 may be managed within a local system or may be centrally managed in a server on a wide area network, such as the Internet. By utilizing a mechanism similar to a CD database (CDDB), additional data for arranging the target sound content data may be downloaded together with the music title or album name of the content data.

Additional data may be recorded in the same providing source as that in which the associated sound content data is recorded. That is, the sound content data and the associated additional data may be recorded in the same disc recording medium, a magnetic disk, or a semiconductor memory. Alternatively, the sound content data and the associated additional data may be stored in a server on a network.

In this case, as the sound content data reader 12 and the additional data reader 22, the same reader in terms of the structure is used. The reader has a function of separating and extracting the read additional data and supplying it to the required elements.

More specifically, the reader has a function of separating and extracting arrange-processing information indicating various types of arrange processing to be supplied to the content data signal processor 14, the sound-adding/editing unit 31, and the output signal processor 32, arrange-processing sound data to be supplied to the decoder 23 and the additional data signal processor 24, and MIDI data, which is also arrange-processing sound data, to be supplied to the MIDI sound producer 25, and of supplying extracted information and data to the corresponding elements.

A description is now given, with reference to FIGS. 2A through 7B, of specific examples of arrange processing performed on target sound content data read by the content data reader 12 on the basis of additional data read by the additional data reader 22.

As stated above, the arrange processing described below is performed by each of the content data signal processor 14, the additional data signal processor 24, the MIDI sound producer 25, the sound-adding/editing unit 31, and the output signal processor 32, or by a combination of the functions of the above-described elements.

In the playback apparatus of this embodiment, the arrange processing performed on sound content data includes adjustments of the tempo, pitch, and volume, applying effects, setting the pan, adding (combining) and inserting arrange-processing sound data, skipping, repeat playback, and rearranging the order of data. Details of the above-described arrange-processing types are individually discussed below.

Figure 2A:
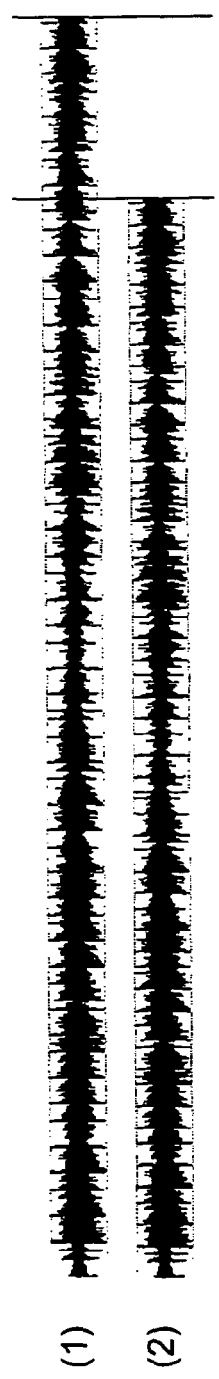

The adjustment of the tempo of sound content data is first discussed with reference to FIG. 2A. In FIG. 2A, (1) indicates the waveform of sound content data (original data) to be played back, and (2) represents sound content data (arranged data) generated by speeding up the tempo of the original content data indicated in (1).

When the tempo of the original content data is increased, the playback time of the arranged sound content data becomes shorter than that of the original sound content data, as indicated in (2). Conversely, when the tempo of the original content data is slowed down, the playback time of the arranged sound content data becomes longer than that of the original sound content data.

As discussed above, in this embodiment, the adjustment of the tempo is performed on the entirety or part of the original sound content data to be played back by speeding up or slowing down the tempo without changing the pitch.

Figure 2B:
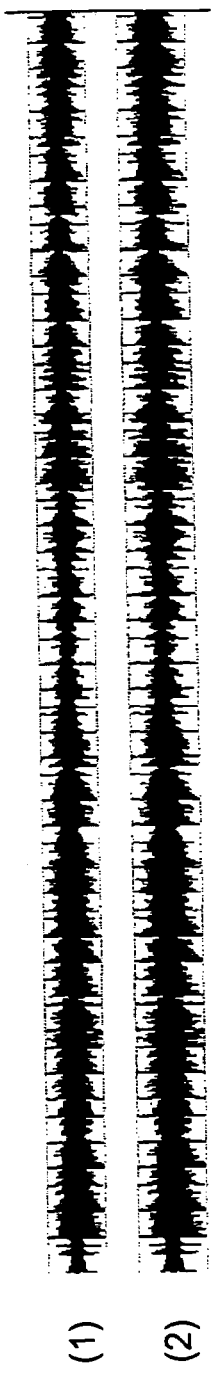

The adjustment of the pitch of sound content data is discussed below with reference to FIG. 2B. In FIG. 2B, (1) indicates the waveform of original sound content data to be played back, and (2) represents the waveform of the arranged sound content data generated by adjusting the pitch of the original sound content data indicated in (1).

In this embodiment, the adjustment of the pitch is performed on the entirety or part of the original sound content data to be played back by raising or falling the pitch without adjusting the tempo. Accordingly, the playback sound of the sound content data with the increased pitch becomes high, and the playback sound of the sound content data with the decreased pitch becomes low.

Figure 3A:
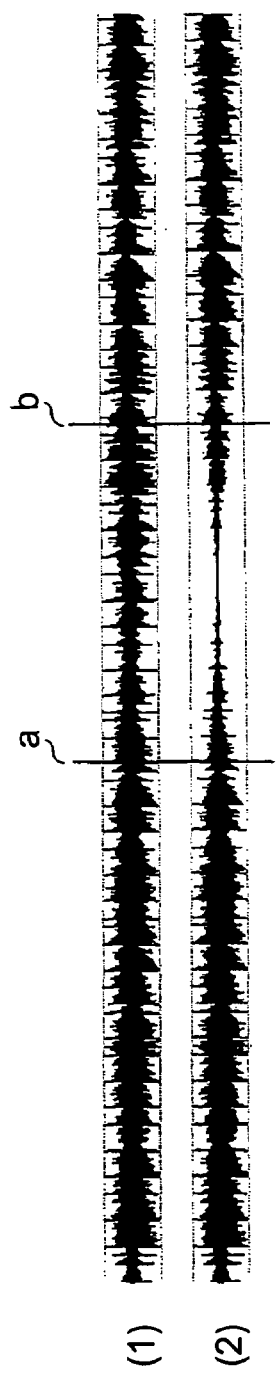

The adjustment of the volume of sound content data is discussed below with reference to FIG. 3A. In FIG. 3A, (1) represents the waveform of original sound content data to be played back, and (2) indicates the waveform of the arranged sound content data generated by decreasing the volume and increasing the volume again at the central zone (indicated by a and b in FIG. 3A) of the original sound content data in (1).

As discussed above, in this embodiment, the adjustment of the volume is performed on the entirety or part of the original sound content data.

Figure 3B:
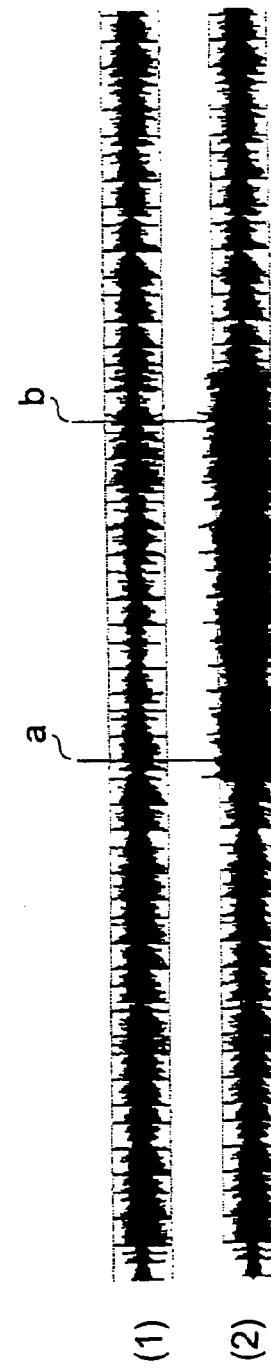

The application of effects is described below with reference to FIG. 3B. In FIG. 3B, (1) designates the waveform of original sound content data to be played back, and (2) indicates the waveform of the arranged sound content data generated by applying distortion to the central zone (indicated by a and b in FIG. 3B) of the original sound content data in (1) as the effect.

As stated above, in this embodiment, the application of effects to sound content data is performed on the entirety or part of the original sound content data to be played back. Specific examples of effect signal processing include, not only the above-described distortion, but also reverb, chorus, equalizer, low pass filter (LPF) processing, and high pass filter (HPF) processing.

The pan setting is described below with reference to FIG. 4. In FIG. 4, (1) indicates the waveform of original sound content data to be played back, and (2) and (3) designate the waveform of the left (L) channel sound content data and the waveform of the right (R) channel sound content data, respectively, generated from the waveform of the original sound content data in (1).

In the example shown in FIG. 4, at the central zone (indicated by a and b in FIG. 4) of the sound content data, the balance on the left and right sides is adjusted so that the L-channel sound content data in (2) and the R-channel sound content data in (3) can be continuously output. With this arrangement, when playing back the sound content data, the sound is moved from the L channel to the R channel. In this embodiment, processing for moving the sound image by adjusting the balance of multi-channel sound content data is referred to as the "pan setting".

In the example shown in FIG. 4, the sound content data of the two channels, i.e., L channel and R channel, is processed. However, in a multi-channel system using 4 channels or 5.1 channels, not only the left and right spatial positions of a sound image, but also the up and down or forward and backward spatial positions of the sound image can be changed (moved).

The combining (adding) of arrange-processing sound data is discussed below with reference to FIG. 5. In FIG. 5, (1) shows the waveform of original sound content data to be played back, (2) and (3) represent the waveforms of arrange-processing sound data to be combined with the original sound content data, and (4) indicates the waveform of the arranged sound content data obtained by combining (adding) the arrange-processing sound data in (2) and (3) with (to) the original sound content data in (1).

That is, in the example shown in FIG. 5, by adding the arrange-processing sound data indicated in (2) and (3) contained in additional data, as discussed above, to the original sound content data indicated in (1), the arranged sound content data indicated in (4) can be generated.

As described above, in this embodiment, the combining of arrange-processing sound data is to add at least one arrange-processing sound data having a predetermined length to a predetermined position of the original sound content data. With this arrangement, by combining at least one different sound data with an original music piece, musical instrument parts or vocal parts, which are not contained in the original music piece, can be added.

Figure 6A:
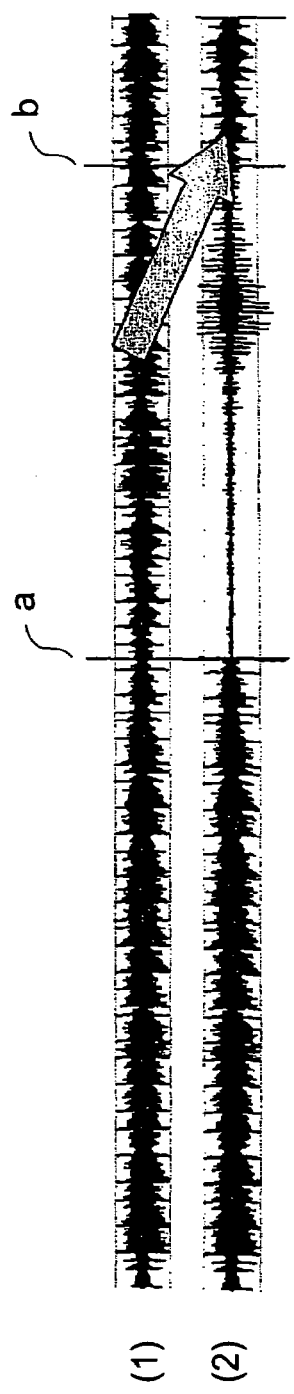

The insertion of arrange-processing sound data is described below with reference to FIG. 6A. In FIG. 6A, (1) indicates the waveform of original sound content data to be played back, and (2) designates the waveform of the arranged sound content data generated by inserting arrange-processing sound data into a portion of the original sound content data indicated in (1).

In the example shown in FIG. 6A, the sound content data represented by (2) is generated by inserting the arrange-processing sound data, which is new sound data, into a zone from position a to position b of the original sound content data in (1) by moving backward the sound content data at the position a to the position b.

The insertion of at least one arrange-processing data having a predetermined length into a predetermined position of original sound content data is referred to as the "insertion of arrange-processing sound data". By using this insertion technique, new parts, such as musical instrument parts or vocal parts, which are not contained in the original sound content data, or new sound data, can be added to the original sound content data, thereby generating new sound content data (arranged data). The insertion of arrange-processing sound data is different from the above-described combining (adding) of arrange-processing sound data in that the original sound content data is moved backward for a time portion in which new sound data is inserted.

Figure 6B:
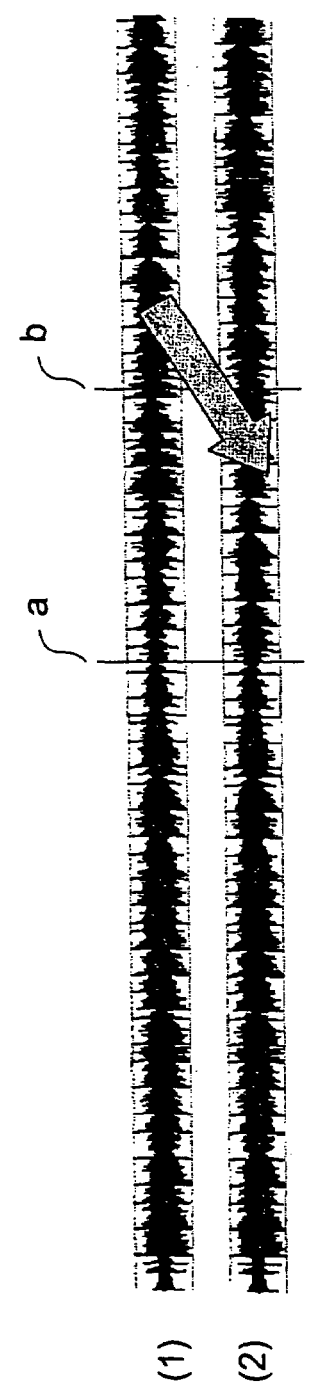

The skipping of sound content data is discussed below with reference to FIG. 6B. In FIG. 6B, (1) represents the waveform of original sound content data to be played back, and (2) indicates the waveform of arranged sound content data generated by skipping part of the original sound content data in (1).

In the example shown in FIG. 6B, in the arranged sound content data in (2), the original sound content data from position a to position b is skipped, and the sound content data after position b is processed. Accordingly, the arranged sound content data shown in (2) can be generated by skipping (not playing back) the sound content data in a zone from the position a to the position b in (1).

The repeat playback operation of sound content data is described below with reference to FIG. 7A. In FIG. 7A, (1) designates the waveform of original sound content data to be played back, and (2) indicates the waveform of the arranged sound content data generated by performing the repeat playback operation on one zone (from position a to position b) of the original sound content data in (1) In the example shown in FIG. 7A, the sound content data in (2) is generated by repeating the zone from position a to position b of the original sound content data in (1) four times. Accordingly, in the sound content data in (2), the zone from position a to position b is repeated four times, as indicated by the arrows in FIG. 7A, and the sound content data after position b follows.

As described above, according to the repeat playback operation of sound content data, new sound content data is generated by repeating a predetermined zone of the original sound content data at least two times.

The rearrangement of the order of sound content data is discussed below with reference to FIG. 7B. In FIG. 7B, (1) designates the waveform of original sound content data to be played back, and (2) illustrates the waveform of the arranged sound content data generated by rearranging the order of the original sound content data in (1).

In the example shown in FIG. 7B, the sound content data in (2) is generated by rearranging the order of data in the zone from a to b and data in the zone from b to c of the original sound content data in (1), as indicated by the arrows in FIG. 7B. In this manner, by rearranging the order of predetermined zones of the original sound content data, new sound content data can be generated.

By applying at least one type, and more preferably, at least two types, of the arranging processing shown in FIGS. 2A through 7B, the original sound content data can be dramatically changed.

In the above-described arrange processing, the adjustments of the tempo and pitch of original sound content data to be played back is performed by the content data signal processor 14 of the sound content data processing system 10, and the adjustments of the tempo and pitch of arrange-processing sound data is performed by the additional data signal processor 24.

The pan setting, the combining of arrange-processing sound data, the insertion of arrange-processing sound data, skipping, repeat playback, and the rearrangement of the order of sound content data are performed by the sound-adding/editing unit 31 of the output data processing system 30. The adjustment of the volume and the application of effects are performed by the output signal processor 32 of the output data processing system 30.

If it is desired that the application of predetermined effects or the adjustment of the volume be performed only on the original sound content data, the corresponding processing can be performed in the content data signal processor 14 of the sound content data processing system 10. Conversely, if it is desired that such processing be performed only on arrange-processing sound data, the corresponding processing can be performed in the additional data signal processor 24 of the additional data processing system 20.

As discussed with reference to FIG. 1, in the playback apparatus of this embodiment, to arrange original sound content data to be played back, additional data corresponding to the original sound content data is required.

The additional data can be largely divided into music information indicating the existing state (original state) of sound content data, arrange-processing information concerning arrange processing performed on the original sound content data and arrange-processing sound data, and arrange-processing sound data to be combined with or inserted into the original sound content data.

More specifically, the additional data includes (1) music information concerning original sound content data to be played back and the corresponding time information, (2) structure information concerning the original sound content data and the corresponding time information, (3) arrange-processing sound data, (4) music information concerning the arrange-processing sound data and the corresponding time information, and (5) arrange-processing information concerning arrange processing performed on the original sound content data and the corresponding time information.

That is, the information items (1) and (2) are music information indicating the existing state of the original sound content data, the information items (4) and (5) are arrange-processing information indicating the type of arrange processing, and the information (3) indicates the arrange-processing data itself. Details of the individual items of information (1) through (5) forming additional data are given below.

The music information concerning original sound content data and the corresponding time information (1) is first discussed. The music information concerning original sound content data includes information concerning the tempo, scale (key), chord progression, beat per minute (BPM), beat information (drum pattern), beat, volume (peak and loudness), and note information of a music piece output by playing back the sound content data.

The tempo is the speed of music, the scale (key) is a feature of music determined by the position of the leading note of, for example, a C major or D major music piece, and the chord progression is the movement from one cord to another chord in a music piece. The BPM is the number of beats per minute (the number of quarter notes, for example, in a four-quarter time music piece), and the beat information indicates, in this example, the rhythm pattern (drum pattern). The beat is the number of pulses, such as duple measure or triple measures which is the base of the rhythm. The volume is the peak or loudness (level) of sound, and the note information indicates the notes forming a music piece, for example, MIDI data.

The required elements of the above-described sound information are included in additional data such that details of the information are associated with the time information indicating the start time and the end time of the information. In the playback apparatus of this embodiment, details of the sound information concerning the original sound content data and the associated time information indicating the start time and the end time of the sound information are provided in the form of a table.

FIGS. 8A, 8B, and 8C illustrate examples of the tables indicating the association between the sound information and the corresponding time information provided as the additional data of original sound content data. More specifically, FIG. 8A illustrates a chord progression table, FIG. 8B illustrates a dram pattern progression table, and FIG. 8C illustrates a tempo progression table.

In this playback apparatus of this embodiment, for the chord progression, a chord progression table indicating the information concerning the chords and the time information indicating the time corresponding to the start times and the end times of the chords, such as that shown in FIG. 8A, is formed and managed. In the chord progression table shown in FIG. 8A, the time information indicates a relative time from the head (0 second) of a music piece played back from the original sound content data.

That is, in the chord progression table shown in FIG. 8A, the chords and the start times and the end times of the chords are chronologically arranged according to the time information, such as the chord from the head (0 second) to 4.12 seconds of the music piece played back from the sound content data is A flat, the chord from 4.12 seconds to 8.24 seconds is E flat, the chord from 8.24 seconds to 17.408 seconds is Fm, the chord from 17.408 seconds to 22.515 seconds is D flat, and so on, thereby enabling the user to understand the chord progression from the head of the music piece.

For the drum pattern progress, a drum pattern progression table indicating the information concerning the drum pattern and the time information indicating the start time and the end time of the drum pattern, such as that shown in FIG. 8B, is formed and managed. As in the chord progression table shown in FIG. 8A, in the drum pattern progression table shown in FIG. 8B, the time information indicates a relative time from the head (0 second) of a music piece played back from the original sound content data.

That is, in the drum pattern progression table shown in FIG. 8B, the drum patterns and the start times and the end times of the drum patterns are chronologically arranged according to the time information, such as the drum pattern from the head (0second) to 4.12 seconds of the music piece played back from the sound content data is Dr1, the drum pattern from 4.12 seconds to 8.24 seconds is Dr2, the drum pattern from 8.24 seconds to 13.245 seconds is Dr1, the drum pattern from 13.245 seconds to 22.515 seconds is Dr2, and so on, thereby enabling the user to understand the drum pattern progression from the head of the music piece.

Normally, there are many cases where the tempo, beat, and scale do not change throughout a music piece. Accordingly, if the tempo contained in the sound information is consistent, a table showing only information indicating the numeric value of the tempo and the time range of the entire music piece, such as that shown in FIG. 8C, is generated.

That is, the information indicating the value of the tempo is 119.45, and the start time and the end time are 00.000 seconds and 27.148 seconds, respectively. If the tempo is changed during the music piece, a table showing information indicating the value of the tempo and the time information indicating the start time and the end time of the tempo, as in FIG. 8A or 8B, is formed.

Concerning the BPM, beat, or volume, a table showing details of the corresponding sound information and the time information indicating the start time and the end time, such as that shown in FIG. 8A or 8B, is formed and managed in the playback apparatus. Regarding the note information, since notes are arranged as the time progresses, it is not necessary that the note information be associated with the time information. However, time information may be provided to manage the partitions of a music piece.

In this example, the absolute time starting from the head of a music piece is used as the time information. However, the time information may be specified by, for example, the "yy-th beat of the xx-th bar". The conversion between the absolute time and the bar and beat can be conducted in terms of BPM. For example, when BPM is 120, one beat is 0.5 seconds, and 180 beats are 90 seconds, which is equal to the first beat of the 45th bar for a four-quarter time music piece. That is, generally, the time information can be determined by time T=60 (seconds)×n (beat)/BPM, or n (beat)=BPM×T/60.

Figure 9:
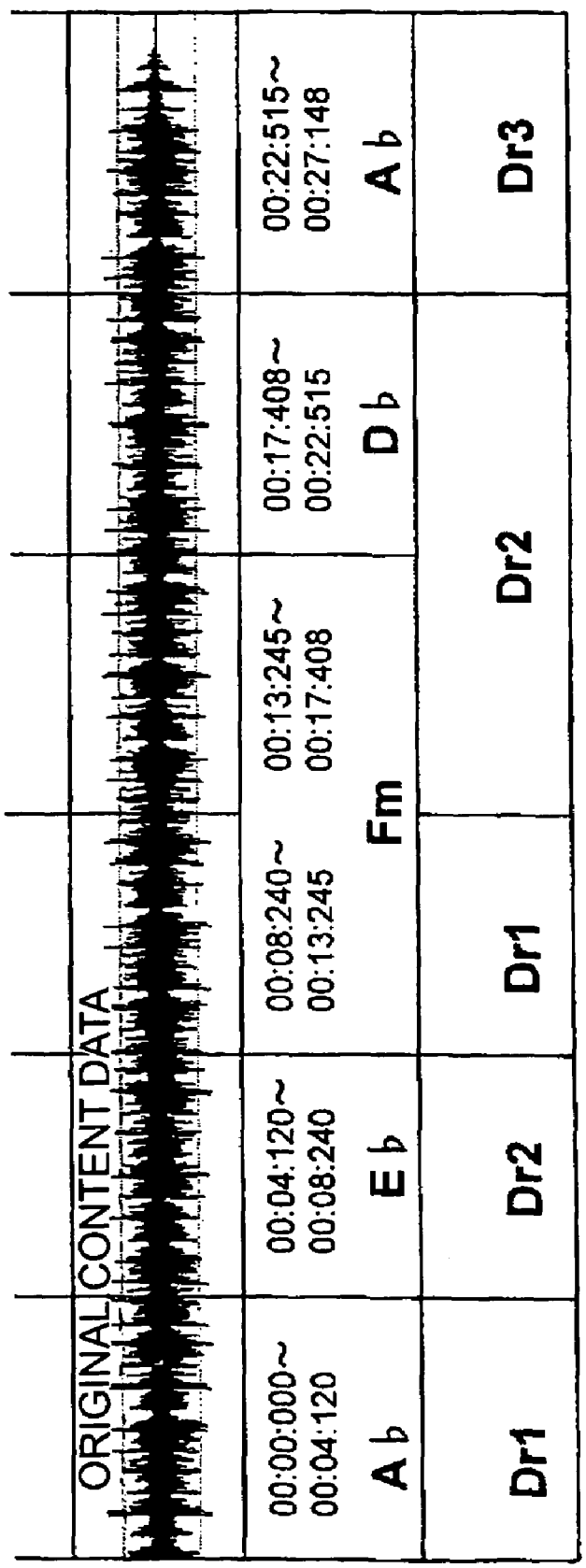
FIG. 9 illustrates an example of an original data time-series map.

Based on the table information shown in FIGS. 8A, 8B, and 8C, a time-series map (original data time-series map) of sound content data to be played back, which is a list table of music information concerning the sound content data, can be formed. FIG. 9 illustrates an example of the original data time-series map formed on the basis of the table information shown in FIGS. 8A, 8B, and 8C.

The waveform at the top of FIG. 9 indicates the original sound content data, followed by the chord progression and the drum pattern arranged in association with the corresponding time information indicating the start time and the end time. The original data time-series map shown in FIG. 9 enables the user to understand the temporal transition of the chord or the drum pattern of the sound content data, and thus, the sound content data can find various applications.

The structure information concerning sound content data to be played back and the corresponding time information (2) is discussed below. The structure information of sound content data indicates individual parts forming a music piece played back from the original sound content data, such as an introduction part, A melody (first melody) part, B melody (second melody) part, highlight part, guitar solo part, and an ending part. The structure information also includes jump information concerning repeats and dal seigno (D.S.).

As in the case of the tables shown in FIGS. 8A, 8B, and 8C, a table showing information indicating the individual parts and the corresponding time information indicating the start time and the end time of each part can be formed in association with each other. For example, information indicating that the sound content data is an introduction part and the time information indicating the start time and the end time of the introduction part can be associated with each other. Concerning the repeats and dal seigno (D.S.), the timing (time information) when the corresponding sign appears and the time information indicating the jump position can be provided.

Given with the structure of a music piece, the user can make arrangements to the music piece as desired, for example, arranging only the introduction part, deleting the introduction part, or repeating the highlight part the arrange-processing data (3) is discussed below. The arrange-processing data is, as shown in FIG. 5 or 6A, sound data for combining or inserting another instrument part or sound with or into original sound content data. A plurality of arrange-processing data can be combined with or inserted into the same bar of the sound content data, and thus, more than one arrange-processing data may be prepared.

Arrange-processing sound can be produced by MIDI data, in which case, arrange-processing sound data does not exist. However, both the arrange-processing sound data and MIDI data may be used. Alternatively, neither of arrange-processing sound data or MIDI data is prepared.

The music information concerning arrange-processing data and the corresponding time information (4) is now discussed. As discussed above, it is not possible to conduct suitable arrangement to original sound content data unless the features and type of original sound content data are precisely understood. The same applies to arrange-processing sound data. That is, the user cannot adjust the arrange-processing sound data before combining or inserting it with or into original sound content data unless he/she understands the features or type of arrange-processing sound data.

Accordingly, in this embodiment, if arrange-processing data is contained in additional data, the music information concerning the arrange-processing data and the corresponding time information are contained in the additional data. As in the original sound content data, the arrange-processing data includes the tempo, scale (key), chord progression, BPM, beat information, beat, note information, and volume (peak and loudness). The arrange-processing data also includes musical instrument information and the duration (number of beats).

The musical instrument information includes the type code of a musical instrument. For percussion sound, such as drum sound, or effect sound without scale, since pitch adjustment is not necessary, or rather, pitch adjustment should not be performed, a determination is made on the basis of the musical instrument information whether pitch adjustment can be performed.

In this manner, the music information concerning the arrange-processing sound data is used for adding or inserting arrange-processing sound data to original sound content data without producing a sense of artificiality on the tempo, chord progression, and beat information of a music piece played back from the original sound content data. If the user understands which part of the original sound content data is being played back, he/she can identify the chord progression, tempo, and rhythm of the original sound content data. The user then combines or adds the arrange-processing data after adjusting the pitch or tempo of the arrange-processing data on the basis of the tempo and rhythm of the original content data, thereby making arrangements to the sound content data without producing a sense of artificiality to listeners. If sound is produced on the basis of MIDI data, note information can be used since arrange-processing sound data is not available.

A description is now given of arrange-processing information concerning arrange processing performed on original sound content data and the corresponding time information (5). The arrange-processing information and the corresponding time information indicate, based on the music information concerning the original sound content data, when and which arrange-processing shown in FIGS. 2A through 7B is used.

FIGS. 10A, 10B, and 10C illustrate specific examples of arrange-processing information. More specifically, FIG. 10A illustrates a sound-addition arrange-processing information table indicating when and which arrange-processing data with which chord is added to the original sound content data.

The sound-addition arrange-processing information table shown in FIG. 10A includes an arrange number indicating the order of arrange processing, time information indicating the start time and the end time of arrange processing, sound data number for specifying arrange-processing data to be added, chord information, and volume information (volume level information).

For arrange number 1, arrange-processing sound data with sound data number 1 is added to the original sound content data in a zone from 0.00 seconds (head) to 4.12 seconds with the chord A flat and the volume −10 dB. Similarly, for arrange number 2, arrange-processing sound data with sound data number 2 is added to the original sound content data in a zone from 4.12 seconds to 8.24 seconds with the chord E flat and the volume −4 dB.

For arrange numbers 3 and 4, two different types of arrange-processing sound data with sound data numbers 3 and 4 are added to the original sound content data in the same zone with the same chord Fm and different volumes −10 dB and −6 dB, respectively. Also for arrange numbers 5 and 6, two different types of arrange-processing sound data with sound data numbers 1 and 3 are added to the original sound content data in the same zone with the same chord D flat and different volumes 0 dB and −10 dB, respectively.

FIG. 10B illustrates a tempo-adjustment arrange-processing table for managing the adjustment timing of the tempo. That is, in the table shown in FIG. 10B, in the original sound content data from 0.00 seconds to 8.24 seconds, the tempo is 120.225 BPM, while in the original content data from 8.240 seconds to 27.148 seconds, the tempo is reduced to 91.3.

FIG. 10C illustrates a repeat arrange-processing information table indicating the portions and number of repeats. In the table shown in FIG. 10C, the original sound content data from the head to 4.12 seconds is repeated twice, and the content data from 13.245 seconds to 22.515 seconds is repeated twice.

In this manner, arrange-processing information tables, such as those shown in FIGS. 10A, 10B, 10C, are formed from the arrange-processing information provided as-additional data, and based on the information shown in FIGS. 10A, 10B, and 10C, an arrange-processing time-series map for managing the association between original content sound data and arrange-processing information, such as that shown in FIG. 11, can be formed.

In FIG. 11, the uppermost waveform indicating the original sound content data is shown followed by the time information indicating the start time and the end time of each chord. Then, the waveforms of the arrange-processing sound data are shown with the chord information in each zone.

The time information shown in FIGS. 10A through 11 is based on the playback time of the original sound content data. If the tempo of the original sound content data is adjusted, the time information is recalculated according to the original time information×playback tempo/original tempo.

As stated above, in the playback apparatus of this embodiment, when sound content data to be played back is determined, the corresponding additional data is obtained. In this case, the original sound content data and the corresponding additional data are associated with each other by identification information (ID), and the associated additional data corresponding to the original sound content data is read.

The read additional data includes the above-described information (1) through (5). As the information table for the original sound content data, tables, such as those shown in FIGS. 8A, 8B, and 8C, are formed, and an original data time-series map, such as that shown in FIG. 9, is generated from the table information shown in FIGS. 8A, 8B, and 8C. Also, as the table for the arrange-processing information, tables, such as those shown in FIG. 10A, 10B, and 10C, are formed, and an arrange-processing time-series map, such as that shown in FIG. 11, is generated from the tables shown in FIGS. 10A, 10B, and 10C.

Then, arrange processing is performed on the original content data by referring to the original data time-series map and the arrange-processing time-series map, thereby generating the arranged sound content data. The sound content data is then played back and the sound is output from a speaker.

A description is given below with reference to the flowcharts of FIGS. 12, 13, and 14, of the operation of the playback apparatus of this embodiment that obtains additional data corresponding to original sound content data in response to a playback instruction from the user and that arranges the original sound content data on the basis of the obtained additional data.

The operation of the additional data reader 22 for creating the tables shown in FIGS. 8A through 10C from the obtained additional data and the time-series maps shown in FIGS. 9 and 11 and for making preparations for performing various arrange processing shown in FIG. 2A through 7B is first discussed below.

Figure 12:
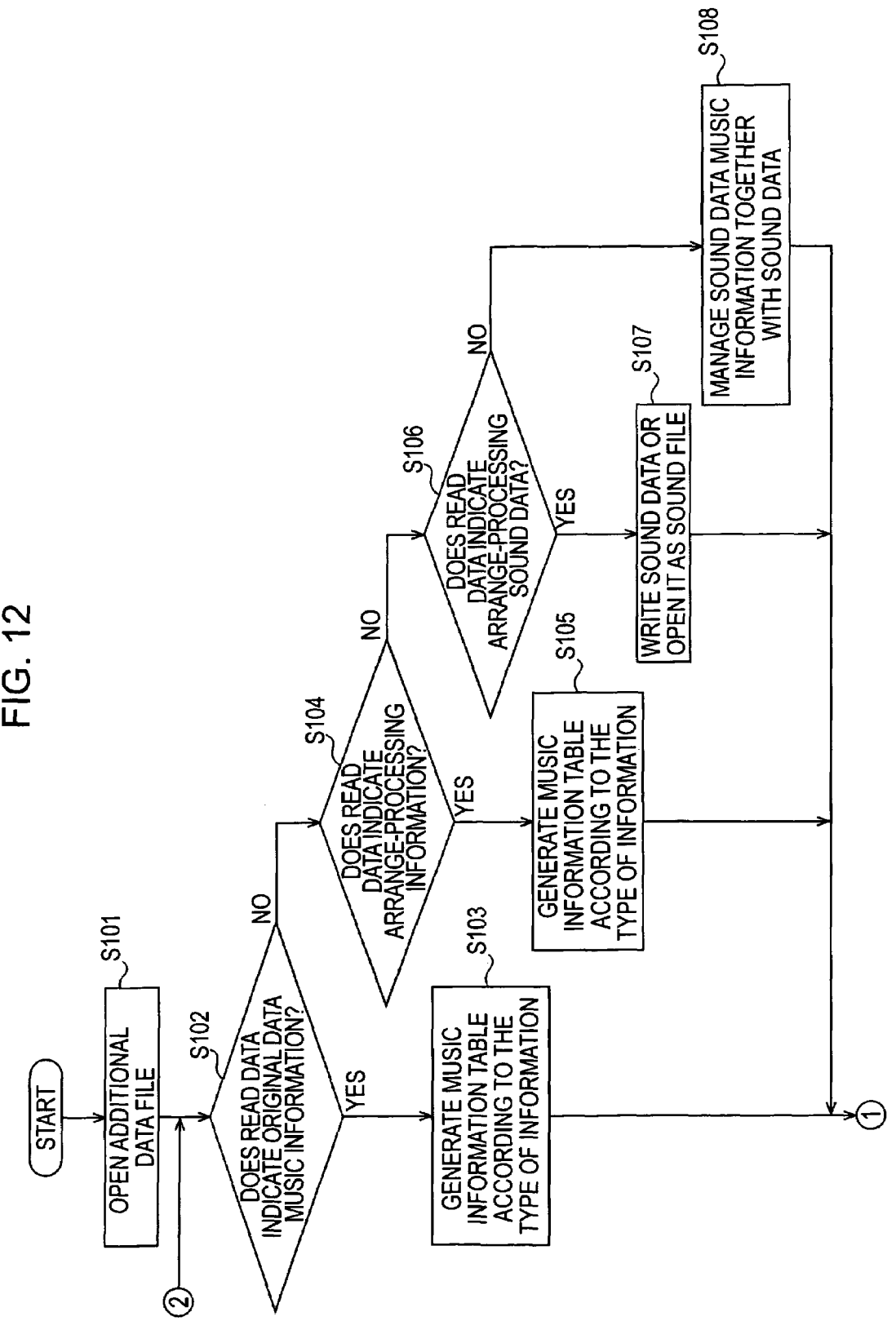
FIGS. 12 and 13 are flowcharts illustrating the operation of an additional data reader.
Figure 13:
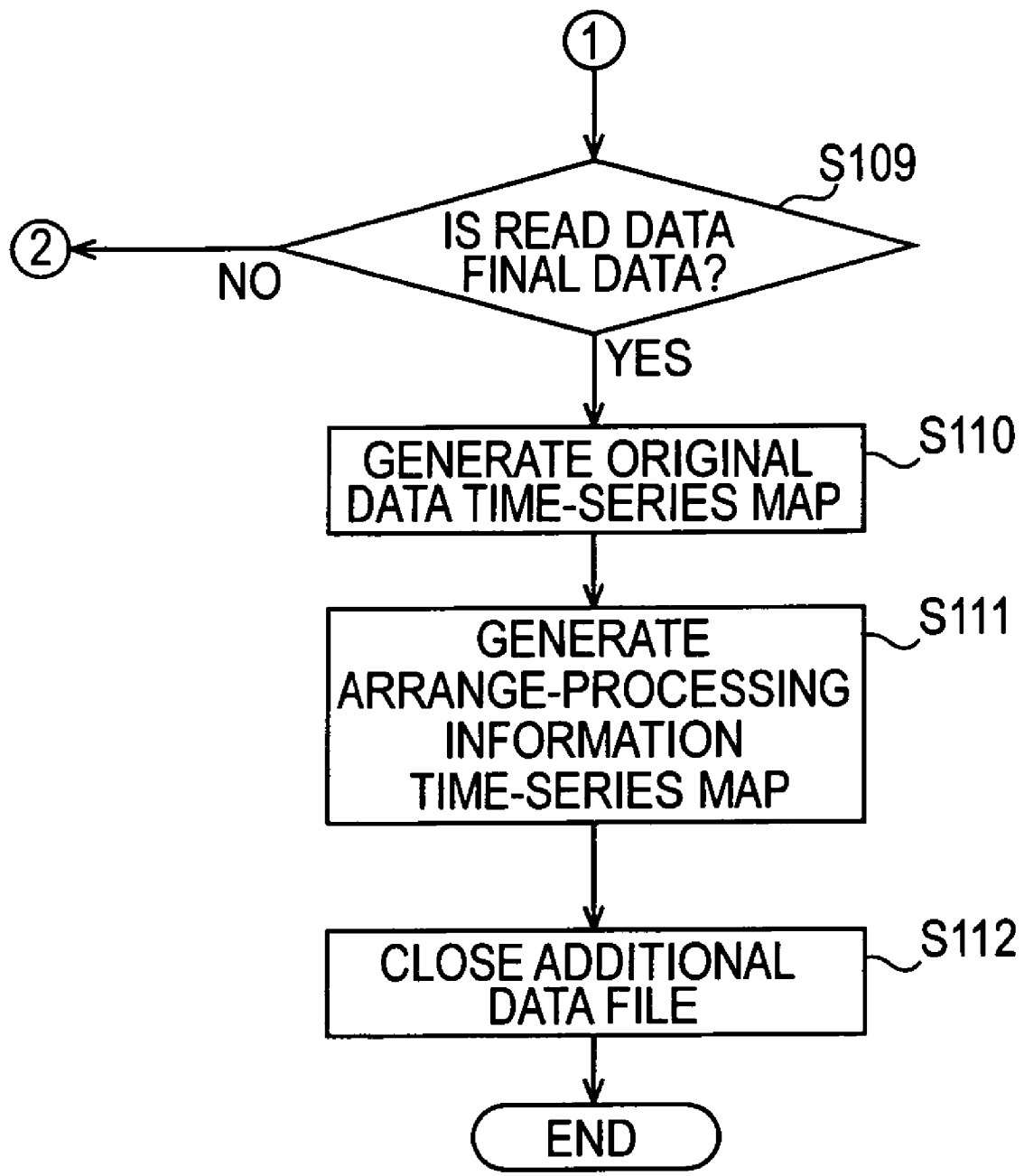

FIGS. 12 and 13 are flowcharts illustrating the operation of the additional data reader 22. The processing indicated by the flowcharts in FIGS. 12 and 13 is executed in the additional data reader 22 under the control of the controller 40 when playing back original sound content data in response to a playback instruction from the user input from the operation unit 45.

More specifically, the additional data reader 22 starts the processing shown in FIGS. 12 and 13 in response to an instruction from the controller 40 to read additional data including ID information of the original sound content data. In step S101, the additional data reader 22 opens an additional data file recording the additional data therein.

Then, in step S102, the additional data reader 22 reads each record of the additional data associated with the sound content data to be played back, and determines whether the read record of the additional data is music information including information indicating the tempo, scale (key), and chord information of the original sound content data and the corresponding time information.

If the read record is found to be the music information concerning the original sound content data in step S102, music information tables, such as those shown in FIGS. 8A, 8B, and 8C, are generated in step S103. If it is determined in step S102 that the read record is not music information, the process proceeds to step S104 to determine whether the read record is arrange-processing information concerning arrange processing to be performed on the original sound content data.

If the read record is found to be arrange-processing information in step S104, the process proceeds to step S105 in which arrange-processing tables, such as those shown in FIGS. 10A, 10B, and 10C, are generated on the basis of the individual arrange-processing information. If it is determined in step S104 that the read record is not arrange-processing information, the process proceeds to step S106 to determine whether the read record is arrange-processing sound data.

If the read record is found to be arrange-processing sound data in step S106, the arrange-processing sound data is written into a predetermined memory or is opened as a sound file in step S107.

If it is determined in step S106 that the read record is not arrange-processing sound data, it means that the read record is music information concerning arrange-processing sound data, and the music information is managed together with the corresponding arrange-processing sound data. More specifically, in step S108, music information tables for arrange-processing sound data, such as those shown in FIGS. 10A, 10B, and 10C, are formed.

Then, after step S103, S105, S107, or S108, the process proceeds to step S109 in FIG. 13 to determine whether the processed record is the final record of the additional data. If it is determined in step S109 that the processed record is not the final record, the process returns to step S102, and another record is read and is processed.

If the processed record is found to be the final record in step S109, the process proceeds to step S110 in which an original data time-series map concerning the original sound content data, such as that shown in FIG. 9, is generated on the basis of the music information tables created in step S103.

Then, in step S111, the additional data reader 22 creates an arrange-processing information time-series map on the basis of the tables generated in step S105 while considering the tempo information (by performing time conversion). After creating the original data time-series map and the arrange-processing information time-series map, the additional data file is closed in step S112. The additional data reader 22 completes the processing shown in FIGS. 12 and 13.

As described above, by obtaining additional data corresponding to original sound content data to be played back and by using music information concerning the original sound content data, information concerning the timing and type of arrange processing, arrange-processing sound data itself, and music information concerning the arrange-processing sound data contained in the obtained additional data, the additional data reader 22 generates an original data time-series map and an arrange-processing information time-series map to make preparations for using the arrange-processing sound data. The additional data reader 22 also generates music information tables concerning the arrange-processing sound data to make preparations for processing the arrange-processing sound data.

According to the processing shown in FIGS. 12 and 13, the position of the original sound content data to be played back, the type of arrange processing, the chord, and the adjustment information of the tempo required at a certain time, can be identified.

A description is now given of the operations of the content data signal processor 14, the additional data signal processor 24, the MIDI sound producer 25, the sound-adding/editing unit 31, and the output signal processor 32 performing arrange processing in the playback apparatus of this embodiment. FIG. 14 is a flowchart illustrating the operations of the sound content data processing system 10, the additional data processing system 20, and the output data processing system 30.

Figure 14:
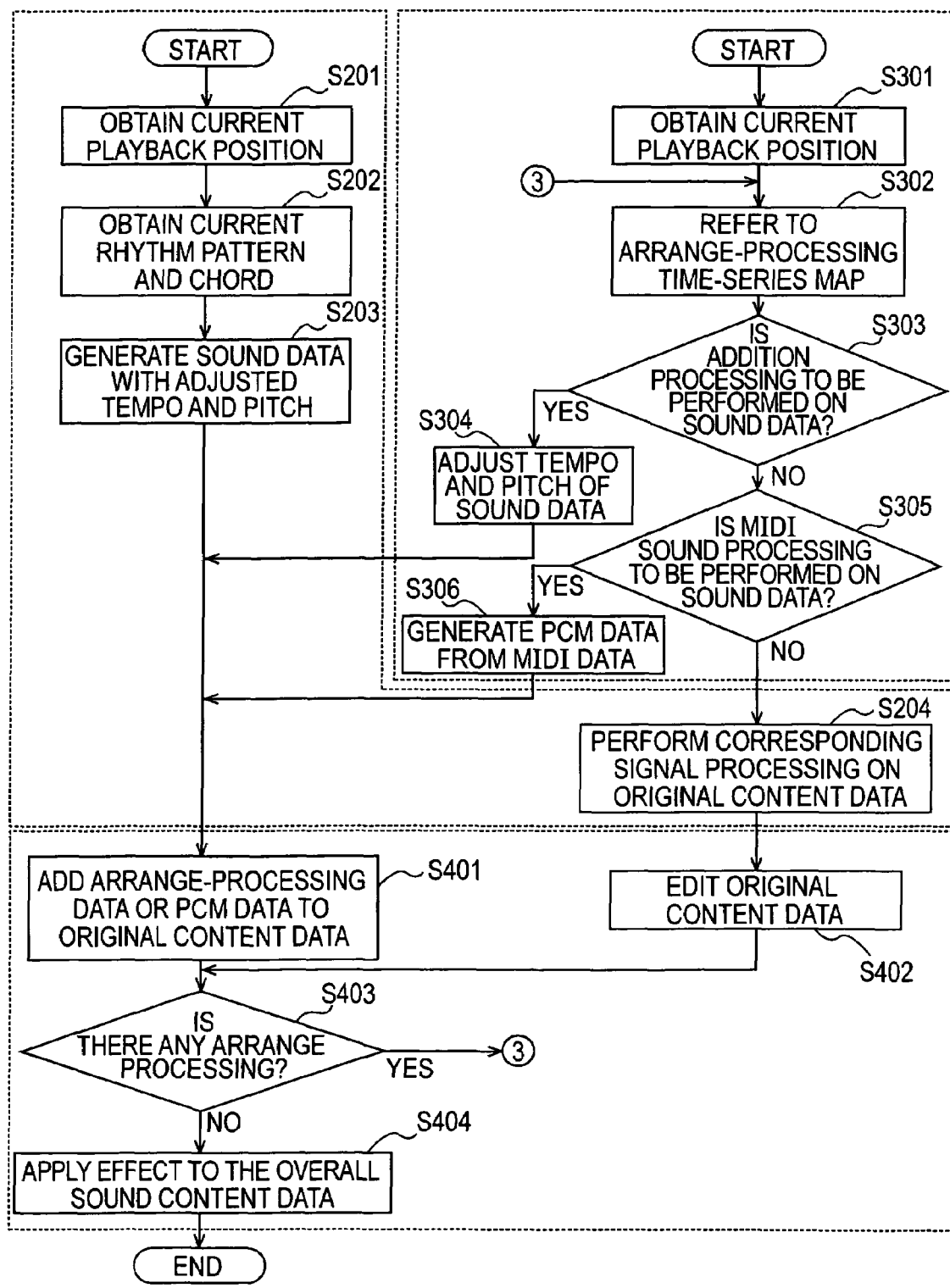
FIG. 14 is a flowchart illustrating the operations of signal processors of a playback apparatus according to an embodiment of the present invention.

In the steps shown in FIG. 14, steps S201 through S204 are performed by the sound content data processing system 10, steps S301 through S306 are performed by the additional data processing system 20, and steps S401 through S404 are performed by the output processing system 30.

After performing the processing shown in FIGS. 12 and 13, the sound content data processing system 10, the additional data processing system 20, and the output data processing system 30 execute the processing shown in FIG. 14 in cooperation with each other.

In step S201, the content data reader 12 reads original sound content data to be played back, in which case, it obtains the playback position of the sound content data from the timing device 50.

Then, in step S202, the read sound content data is decoded in the decoder 13 and is supplied to the content data signal processor 14. The content data signal processor 14 then obtains information concerning the current rhythm pattern and chord of the original sound content data by referring to the music information time-series map generated in the additional data reader 22 as described with reference to FIGS. 12 and 13.

In step S203, the content data signal processor 14 conducts the tempo and pitch adjustments by referring to the arrange-processing tables concerning the tempo and pitch generated by the additional data reader 22 to generate sound content data, and supplies the generated sound content data to the sound-adding/editing unit 31 of the output signal processing system 30.

Meanwhile, in the additional data processing system 20, in step S301, the additional data reader 22 obtains the playback position of the original sound content data. Then, by referring to the arrange-processing time-series map generated in the additional data reader 22 in step S302, the additional data reader 22 determines in step S303 whether the arrange processing to be performed on the sound content data is addition processing for the arrange-processing sound data.

If the arrange processing is found to be the addition processing for the arrange-processing sound data in step S303, the process proceeds to step S304. In step S304, on the basis of the music information table concerning the arrange-processing sound data and the arrange-processing information time-series map generated in the additional data reader 22, the additional data reader 22 adjusts the tempo and the pitch of the arrange-processing sound data and supplies the resulting arrange-processing sound data to the sound-adding/editing unit 31.

If it is determined in step S303 that the arrange processing to be performed on the sound content data is not the addition processing, the process proceeds to step S305 to determine whether the arrange processing is sound producing performed by using MIDI data. If the arrange processing is found to be sound producing based on MIDI data in step S305, the MIDI sound producer 25 produces PCM data from the MIDI data provided as the additional data, and supplies the PCM data to the sound-adding/editing unit 31 in step S306.

Then, in the output processing system 30, in step S401, the sound-adding/editing unit 31 adds (combines) the arrange-processing sound data with the adjusted tempo and pitch supplied from the additional data signal processor 24 or the PCM data supplied from the MIDI sound producer 25 to the sound content data with the adjusted tempo and pitch supplied from the content data signal processor 14.

If it is determined in step S305 that the arrange processing is not sound producing based on MIDI data, the process proceeds to step S204. In step S204, the additional data reader 22 supplies information based on the arrange-processing time-series map to the content signal processor 14, and the content signal processor 14 performs various arrange processing according to the arrange-processing time-series map information. Then, in step S402, the sound-adding/editing unit 31 edits the sound content data by, for example, performing reverb processing or deleting or rearranging the order of predetermined zones, according to the arrange-processing time-series map.

After step S401 or S402, the additional data reader 22 determines in step S403 whether another arrange processing is to be performed (whether there is another arrange processing in the arrange-processing time-series map).

If another arrange processing is found in step S403, the process returns to step S302. If there is no arrange processing, in step S404, effect processing, such as reverb processing, is performed on the entire sound content data, in the output signal processor 32. The processing shown in FIG. 14 is then completed.

The sound content data to which various arrangements are made as discussed above is D/A converted, and the resulting analog signal is supplied to the speaker so that the corresponding sound content data is played back.

As described above, according to the playback apparatus of this embodiment, specific signal processing is performed on the basis of additional data indicating the type of processing to be performed on original sound content data. Additionally, by adding arrange-processing sound data to the original sound content data or by rearranging the order of predetermined portions of the original sound content data, new sound content data can be generated on the basis of existing sound content data.

As stated above, a plurality of types of arrangements can be made to the same portion of sound content data. That is, as viewed from a momentary playback time, it is possible that many types of arrangements are simultaneously made to the original sound content data.

In the playback apparatus of this embodiment, information required for arrange processing is added as additional data to original raw sound content data. The additional data is managed separately from the original sound content data, and actual arrange processing is performed when or before the playback operation is performed.

Accordingly, the additional data is obtained via a recording medium or a network by the user separately from the original sound content data. The additional data may be provided together with the original sound content data, in which case, the sound content data is recorded on a CD with the additional data as a pair, and the additional data is read when necessary.

Alternatively, when sound content data is obtained via a network, such as the Internet, the corresponding additional data can be provided together with the sound content data so that it can be available to the user. That is, by adding the common ID information to the sound content data to be played back and the associated additional data, only the additional data can be provided to the user separately from the sound content data.

The sound content data obtained by the content data reader 12 of the sound content data processing system 10 may be in the form of linear PCM data or compressed sound data compressed with a corresponding data compression method.

The arrange-processing sound data to be provided as additional data may be at least one of prerecorded linear PCM data, compressed sound data, and MIDI data.

As stated above, the additional data may be obtained from a recording medium different from that recording the original sound content data. For example, the sound content data may be obtained from a CD, and the associated additional data may be obtained from another recording medium, such as a semiconductor memory, a magnetic recording medium, an optical recording medium, or a magneto-optical recording medium, or via a network, such as the Internet.

As stated above, the sound content data and the corresponding additional data can be associated with each other by the common identifier (ID). Simply, the identifier of the sound content data may be added to the additional data, or conversely, the identifier of the additional data may be added to the sound content data.

In the foregoing embodiment, arrange processing is performed in real time when playing back sound content data, and then, the arranged sound content data is played back. However, various arrange processing may be performed on sound content data by using the corresponding additional data in advance, and then, the arranged sound content data is played back. That is, arrange processing using additional data may be collectively performed, as in batch processing, and the arranged sound content data is played back.

Additionally, a plurality of additional data for performing different types of arrange processing on one piece of sound content data may be prepared, and then, the user can select a desired type of additional data. For example, various types of additional information, such as arrange-processing data for the morning and arrange processing data for the evening, for the same sound content data are prepared, and the user is allowed to select a desired type of additional data and make various arrangements to the sound content data by using the selected additional data.

Additional data may be dynamically generated by using an external program different from that used in the playback apparatus, and the additional data reader 22 reads the dynamic program. This makes it possible to change the entirety or part of the static arrangements made in this embodiment according to the user's environments. The user can also change the entirety or part of the arrangements on their own while listening to music.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus comprising:

first acquiring means for acquiring sound content data;

second acquiring means for acquiring additional information corresponding to the sound content data acquired by the first acquiring means, the additional information being associated with time information for specifying a portion of the sound content data to be processed; and signal processing means for performing signal processing on the sound content data acquired by the first acquiring means on the basis of the additional information acquired by the second acquiring means and for outputting the processed sound content data, the signal processing means performs adjusting a playback chord progression of the sound content, and the signal processing means performs signal processing on the portion of the sound content data on the basis of the additional information associated with the time information.

2. The playback apparatus according to claim 1, wherein the signal processing means performs at least one of adjusting a playback tempo of the sound content data, adjusting a playback pitch of the sound content data, adjusting a playback volume of the sound content data, combining at least one sound data with the sound content data, inserting at least one sound data into the sound content data, rearranging the order of part of the sound content data, repeating part of the sound content data, deleting part of the sound content data, and applying effect to the sound content data.

3. The playback apparatus according to claim 1, wherein the additional information includes at least one of the tempo, chord progression, pitch, duration, beat, structure information, type of musical instrument, and volume of the sound content data, and the signal processing means identifies the original state of the sound content data before being subjected to the signal processing on the basis of the additional information.

4. The playback apparatus according to claim 3, wherein the structure information includes time information indicating at least one of a repeat pattern, an introduction part, a highlight part, a first melody part, a second melody part, and a refrain part of the sound content data, and the signal processing means identifies the original data structure of the sound content data before being subjected to the signal processing on the basis of the structure information.

5. The playback apparatus according to claim 1, wherein the additional information includes at least one sound data to be combined with or inserted into the sound content data, and the signal processing means combines or inserts the sound data contained in the additional information with or into the sound content data.

6. The playback apparatus according to claim 5, wherein the signal processing means combines or inserts the sound data contained in the additional information with or into the sound content data by performing at least one of adjusting a volume, and applying effect on the sound data contained in the additional information.

7. The playback apparatus according to claim 1, further comprising timing means for managing the first acquiring means and the second acquiring means such that the second acquiring means acquires additional information for the sound content data as the corresponding sound content data is acquired by the first acquiring means.

8. The playback apparatus according to claim 1, wherein the signal processing means combines the processed sound content data with original sound content data.

9. A playback method for sound content data, comprising:
performing first acquiring processing for acquiring sound content data;
performing second acquiring processing for acquiring additional information corresponding to the sound content data acquired in the performing first acquiring, the additional information being associated with time information for specifying a portion of the sound content data to be processed; and
performing signal processing on the sound content data acquired in the performing first acquiring on the basis of the additional information acquired in the performing second acquiring and outputting the processed sound content data, the performing signal processing including adjusting a playback chord progression of the sound content, and the performing signal processing performs signal processing on the portion of the sound content data on the basis of the additional information associated with the time information.

10. The playback method according to claim 9, wherein the performing signal processing performs at least one of adjusting a playback tempo of the sound content data, adjusting a playback pitch of the sound content data, adjusting a playback volume of the sound content data, combining at least one sound data with the sound content data, inserting at least one sound data into the sound content data, rearranging the order of part of the sound content data, repeating part of the sound content data, deleting part of the sound content data, and applying effect to the sound content data.

11. The playback method according to claim 9, wherein the additional information includes at least one of the tempo, chord progression, pitch, duration, beat, structure information, type of musical instrument, and volume of the sound content data, and the performing signal processing identifies the original state of the sound content data before being subjected to the signal processing on the basis of the additional information.

12. The playback method according to claim 11, wherein the structure information includes time information indicating at least one of a repeat pattern, an introduction part, a highlight part, a first melody part, a second melody part, and a refrain part of the sound content data, and the performing signal processing identifies the original data structure of the sound content data before being subjected to the signal processing on the basis of the structure information.

13. The playback method according to claim 9, wherein the additional information includes at least one sound data to be combined with or inserted into the sound content data, and the performing signal processing combines or inserts the sound data contained in the additional information with or into the sound content data.

14. The playback method according to claim 13, wherein the performing signal processing combines or inserts the sound data contained in the additional information with or into the sound content data by performing at least one of adjusting a volume, and applying effect on the sound data contained in the additional information.

15. A playback apparatus comprising:
a first acquiring unit configured to acquire sound content data;
a second acquiring unit configured to acquire additional information corresponding to the sound content data acquired by the first acquiring unit, the additional information being associated with time information for specifying a portion of the sound content data to be processed; and
a signal processor configured to perform signal processing on the sound content data acquired by the first acquiring unit on the basis of the additional information acquired by the second acquiring unit and to output the processed sound content data, the signal processor configured to perform adjusting a playback chord progression of the sound content, and the signal processor performs signal processing on the portion of the sound content data on the basis of the additional information associated with the time information.

16. The playback apparatus according to claim 15, further comprising a timing unit configured to manage the first acquiring unit and the second acquiring unit such that the second acquiring unit acquires additional information for the sound content data as the corresponding sound content data is acquired by the first acquiring unit.

17. The playback apparatus according to claim 15, wherein the signal processor is configured to combine the processed sound content data with original sound content data.

* * * * *